United States Patent
Batty et al.

(10) Patent No.: US 8,425,666 B2
(45) Date of Patent: *Apr. 23, 2013

(54) BACK PRESSURE-MATCHED, INTEGRATED, ENVIRONMENTAL-REMEDIATION APPARATUS AND METHOD

(75) Inventors: J. Clair Batty, North Logan, UT (US);
Craig E. Cox, Fruit Heights, UT (US);
David A. Bell, Farmington, UT (US)

(73) Assignee: Purestream Technology, LLC, Salt Lake City, UT (US)

( * ) Notice: Subject to any disclaimer, the term of this patent is extended or adjusted under 35 U.S.C. 154(b) by 342 days.

This patent is subject to a terminal disclaimer.

(21) Appl. No.: 12/687,753

(22) Filed: Jan. 14, 2010

(65) Prior Publication Data

US 2010/0176064 A1 Jul. 15, 2010

Related U.S. Application Data

(60) Provisional application No. 61/144,665, filed on Jan. 14, 2009, provisional application No. 61/144,694, filed on Jan. 14, 2009.

(51) Int. Cl.
*B01D 47/00* (2006.01)

(52) U.S. Cl.
USPC ...... 95/235; 423/224; 423/243.03; 423/245.3

(58) Field of Classification Search .................. 210/151, 210/737; 95/195, 205, 232, 235, 237; 423/220, 423/224, 235, 242.1, 243.03, 245.1, 245.3
See application file for complete search history.

(56) References Cited

U.S. PATENT DOCUMENTS

| 3,704,570 | A | * | 12/1972 | Gardenier | 95/227 |
| 4,149,378 | A | * | 4/1979 | Nakamura et al. | 60/293 |
| 4,572,292 | A | * | 2/1986 | Stapp | 166/400 |
| 2010/0175983 | A1 | * | 7/2010 | Batty et al. | 203/24 |
| 2011/0083556 | A1 | * | 4/2011 | Duesel et al. | 95/158 |

FOREIGN PATENT DOCUMENTS

GB 1218912 * 1/1971

* cited by examiner

*Primary Examiner* — Robert A Hopkins
(74) *Attorney, Agent, or Firm* — Pate Baird, PLLC (57) ABSTRACT

Production brines are used to scrub a horizontal stack receiving exhaust from an energy source, controlling, reducing, or both noxious chemicals. Mutual remediation of flows from petroleous production cool and scrub exhausts from flares burning waste hydrocarbons, heaters lowering viscosity of crude oil, engines driving oil pumps or natural gas compressors, and the like. Resulting evaporation of production brines results in distilled water, more concentrated brines to reduce hauling, or, optionally, dehydrated dry waste minerals from the brines. Year-round operation of brine evaporation ponds is facilitated, and may be another source of process pre-heating.

18 Claims, 8 Drawing Sheets

BACK PRESSURE-MATCHED, INTEGRATED, ENVIRONMENTAL-REMEDIATION APPARATUS AND METHOD

BACKGROUND

1. Related Applications

This application claims the benefit of U.S. Provisional Patent Application Ser. No. 61/144,665 filed Jan. 14, 2009 and U.S. Provisional Patent Application Ser. No. 61/144,694 filed Jan. 14, 2009, and incorporates by reference the entirety of each thereof.

2. The Field of the Invention

This invention pertains to remediation of environmental discharges associated with production of petroleum products such as crude oil and gas, and more particularly to integrated systems for heat recovery, scrubbing stacks, and handling production brines.

3. The Background Art

The production and transport of petroleum resources (e.g. petroleouos compositions, such as crude oil, natural gas, derivatives thereof, or the like) at the well head involve many processes. Drawing, processing, heating, compressing, pumping, and otherwise handling petroleum resources retrieved from the earth can require substantial amounts of energy in their own right. Rejected heat from motors, heaters, flares, and the like have not heretofore been a problem in remote areas. Likewise, emission of particulates, discharge of production water, and the like have been treated in various ways.

What is needed is a method and apparatus for remediation of potential environmental effects of petroleum production. It would be an advance in the art to provide a method to recover, control, dispose of, or otherwise minimize the environmental impact of such flows as waste heat, salt water, entrained volatile organic compounds, and the like that may occur. It would be a further advance to solve the problems at each site, whether they occur singly or in combination. One or more of these effluents may occur at various production and transport sites, such as well heads, pumping stations, compressor stations, transport stations, and the like.

It would also be an advance in the art to provide remediation for the individual effects and effluence of petroleum production and transport stations. It would be a further advance in the art to provide a balanced, integrated system and method for handling these effluents and their consequences. It would be yet a further advance in the art to provide an integrated solution to environmental effluents resulting in improved overall efficiencies in the operation of production and transport systems.

BRIEF SUMMARY OF THE INVENTION

In general, an apparatus and method in accordance with the invention may typically include integrated system of stacks, flares, recovery vessels, scrubbers, separators, condensers, heat exchangers, energy collectors, and the like to remediate environmental effluents. In certain embodiments, various apparatus and methods in accordance with the invention provide control of back pressure on stacks and exhausts from motors, heaters, flares, and the like. Also, certain embodiments may provide for substantially horizontal stacks subjected to efficient scrubbing of volatile organic compounds, particulates, and the like from streams of exhaust gases.

Likewise, separators may separate out brines from volatile or other organic compounds. Moreover, distilled water or cleaned condensate may be drawn from or discharged from scrubbers. Meanwhile, brines may be recycled and concentrated for eventual disposal in evaporation ponds. Complete drying may support transport of waste solids to dry depositories as a result of a complete extraction of liquids by evaporation.

In certain embodiments, various apparatus and methods in accordance with the invention may rely on flame holders, internal flaring, dampers, pumps, blowers, and the like to regulate pressures throughout a system of scrubbers, condensers, evaporators, and the like. In certain embodiments, solar collection through salt gradient solar ponds (SGSP) may provide energy for augmentation of evaporative processes. In some embodiments, production waters containing salts may service solar ponds. As part of solar ponds or in addition to solar ponds, evaporative surfaces may concentrate brines and dry dissolved solids for disposal without destroying surrounding environments with salt mist otherwise discharged.

Various installations may include one or more methods to remediate effluents, including, for example, heat, unburned hydrocarbons, volatile organic compounds, particulates, dissolved solids, salts, water, brine, and the like. A modular approach provides for application of a method and an installation of an apparatus tailored to the quantities and other particular remediation needs of a specific site. Thus, an apparatus implemented in accordance with the invention may be modularized in order to adequately handle the effluent output of a particular site, and the particular species (or specie) particular to that site. Petroleum production fields can benefit by having waste heat, waste water, and noxious emissions remediating each other. Outputs may be concentrated salts, distilled water, and scrubbed exhaust air, free of volatile organic compounds (VOCs) trapped out in a waste water spray. For example, a method may use waste water to remediate hydrocarbon emissions, and the heat of an exhaust containing hydrocarbon emissions to treat salinated waste water. Hot exhaust gases, with or without solar energy assistance, may drive evaporation or other drying processes resulting in condensed, distilled water, dry salt to be hauled away, and clean vapors released to the environment.

A commercial, production material may typically include a hydrocarbon compound such as crude oil, natural gas, or the like. It may also include a byproduct material when initially extracted. When the production material includes at least one of crude oil and methane, the byproduct material may typically include water and salt (e.g., a brine) at a concentration rendering the water unfit for agricultural crops.

The byproduct material may be separated promptly after extraction from the ground, such as in a separator. Process steps separating hydrocarbons from the liquid portion of the byproduct material may precede, succeed, or both, the evaporating of all or some portion of water in the byproduct material.

Field processing of the production material may involve applying energy to the production material from the power source. Some processing may occur in the field (onsite), and may include compressing a gas, pumping a fluid, reducing a viscosity of a fluid, flaring off a hydrocarbon vapor, and so forth. For example, a highly viscous crude may be heated to reduce viscosity for pipeline transport, downhole crude may be heated to reduce viscosity for easier extraction, natural gas may be compressed for pipeline transport, liquid crude may be pumped to increase pressure driving the flow, and so forth. Any or all of these processing options may take place at a particular site, nearby, remotely, or all of the foregoing.

Many sources of power exist, and their power output may be mechanical, thermal, or both. For example an operating power source may be a motor, such as a diesel engine to drive a pump or compressor. The power source may be, instead or in addition, a source of thermal energy as a power output. For example, a flare, a heater, or a diesel engine may consume, by burning or other chemical process, a hydrocarbon, thus producing an exhaust.

Whether the power source is an engine driving pumping (production pump, transport pump, compressor, etc.), a heater heating the production material for production or transport, or a flare burning off unusable vapors, the power source may burn a portion of the production material or import fuel, generating an exhaust stream. Therefore, the exhaust stack of such combustion may need to be scrubbed to remove volatile organic compounds, particulate materials, entrained solids, or the like from the exhaust by exposing the exhaust to the byproduct material. For example, a brine sprayed into a scrubber may treat the exhaust flow, evaporating at least a portion of the byproduct material, for example water to water vapor.

Processing the production material may rely on a power source rejecting heat, directly from combustion or from a thermodynamic cycle, at or near the production site. By capturing the heat rejected by the power source, temperature of the byproduct material may be elevated by heat exchange, evaporating vapors from the byproduct material. For example, scrubbing organic and other compounds from the exhaust into byproduct water may include preheating the water with heat from the exhaust. Such preheating may increase evaporation of the brine to water vapor. This may be further increased by providing an evaporation chamber maintained at a pressure below ambient conditions. A residual of evaporation or partial evaporation may include dissolved solids extracted. The residual may be removed from the production site and its surrounding environment for disposal. Brine may be either dried or concentrated and stored as a liquid. Even then it may be evaporated completely over time, precipitated out at high concentrations, or the like. In one embodiment, the hottest region of an exhaust gas flow may power a dryer to dry brines to salts so they can be trucked out as solids.

An engine may produce over 20,000 lbs/hr of exhaust at over 900 degrees Fahrenheit exhaust gas. In one embodiment of a pumping station, a bank of several motors, each of about 2400 horsepower, turns out about 28,000 lbs/hr of exhaust at from about 850 to about 970 degrees Fahrenheit. Meanwhile, in one embodiment of a production field, water from wells in petroleum production contains from about 1500 parts per million to about 10,000 parts per million salt. A salt pond may receive such water before using it for scrubbing the exhaust, afterward, or both. The pond may be used strictly for evaporating, or may be used for separating volatile organic compounds (VOCs, hydrocarbons). Ponds may collect solar heat, even recycling heat into brines used for scrubbing, evaporating, or both.

If air is used as a coolant, only sensible heat is available, whereas water vapor has a latent heat about 100 times as great ratio of specific heat times temperature change compared to latent heat is inverse to mass required) as the sensible heat typically available due to temperature rise in the air.

The elevated temperature, due to sensible heat, and any additional latent heat added may contribute to evaporating a vapor from the byproduct material.

A process may form a residual upon evaporation (vaporization) of a portion of the byproduct material. The residual may include dissolved solids extracted from or concentrated within a remaining portion of the byproduct material. For example a residual from production brines in a well field may be a more concentrated brine or simple the dehydrated solids left after all water is evaporated.

Where the byproduct material is brine, exchanging heat may be accomplished directly by exposing the exhaust to the brine, resulting in evaporating water from the brine, scrubbing hydrocarbons from the exhaust, and cooling the exhaust. In certain embodiments, an evaporation or scrubbing chamber may be maintained at a pressure below ambient conditions in order to promote evaporation. After evaporating water from the byproduct material, a portion of the evaporated water may be recovered as distilled water or at least water devoid of the dissolved solids left behind. Some other portion of the water vapor may be released into the environment as clean or comparatively clean vapor.

In one embodiment of a method in accordance with the invention, concurrent, integrated, mutual remediation may involve a production material, a power source, and a byproduct material at a production site. Alternatively, the entire process may actually take place in stages and at disparate sites. For example, one may select a production site and a production material, which may include one or more principal materials of commerce as well as one or more byproduct materials distinct therefrom.

Water vapor may release into the environment, while hydrocarbons separated from the brine before and after the evaporation or scrubbing processes may be burned or otherwise recycled. Ultimately, salts left behind from substantially completely evaporating the water may be hauled away for use or other disposal. Condensing water vapor may provide a source of distilled water.

A modular evaporator, scrubber, or both may be arranged in series to accomplish adequate evaporation or scrubbing, respectively. Likewise, such modules may be arranged in parallel instead, or in addition, to support the exhaust flows available. A scrubber, evaporating chamber, or the like may be arranged substantially horizontally on the surface of the ground, on mounts, or underground as a "horizontal stack" instead of a vertical. Without the benefit of stack height to drive flows, one or more blowers may extract the exhaust from the scrubber or evaporating chamber. A combination of dampers and blowers may control back pressure for the exhaust line of a power source served by the system.

A condenser may include a counter-flow heat exchanger taking in ambient air to cool a tailwater stream exiting the evaporating chamber. By condensing water from the exhaust stream, latent heat may be recovered. Suitable geometry may include counter-current conduits with or without fins extending into flows to augment heat transfer. Pre-heating followed by a drop in pressure may support flashing some water introduced into a scrubber, evaporation chamber, or a combination thereof.

Heat may be exchanged by a condenser of a shell-and-tube, counter-flow type, wherein water is evaporated and scrubs the stack gases, cooling them before release into the environment. Recovery of distilled water for re-use is possible by cooling, vapor compression, or both to condense water from an evaporation chamber or stack gas scrubber.

A solar pond may be used in combination therewith, receiving preheated water from the evaporation chamber introduced to the top of the pond (freshest on top), while maintaining a more concentrated brine therebelow. The brine below may actually achieve a temperature above the ambient boiling point of pure water. The surface of the solar pond may be flushed with pre-heated brine of comparatively lower concentration, keeping the pond operational, even in freezing weather. This replenishing helps to counteract salt diffusion toward the surface from the bottom as driven by a concentration gradient. Meanwhile, more concentrated brines may be introduced lower in the pond. Thus a concentration gradient may be maintained.

At some sites, little or no hydrocarbon fuel is burned. A producing well, such as in crude oil or coal-bed methane fields will typically have at least a small motor in operation, but the heat rejected therefrom may not be deemed efficiently recoverable. In such situations, remediation may rely on alternative energy such as salt gradient solar ponds or the like. In any such fields the hydrocarbon oil or gas may be extracted with production water, and then separated therefrom.

Where the volume of water exceeds the water needed to remediate an exhaust stream, or where there is no exhaust source, water may still be remediated. Passing ambient air through a condenser preheats it. Passing air into an evaporator, such as a horizontal stack or chamber at reduced pressure evaporates some of the water. The vapors may be condensed, possibly at increased pressure, in an air cooled condenser. The vapor condensate is distilled water.

Meanwhile, the briney liquid remaining may pass to the surface of a solar pond to keep the pond operational in freezing weather and enhance surface evaporation at substantially all times. Harvesting solar-heated hot water from the pond by direct or indirect heat exchange may also aid evaporation in the evaporator as latent heat of condensate is recycled. Thus, the sensible heat in the water, and recycled latent heat from the condenser may contribute to the latent heat of vaporization in the evaporator. Heated ambient air and heat from a solar pond may both be used to heat the evaporator or the water sprayed into it.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
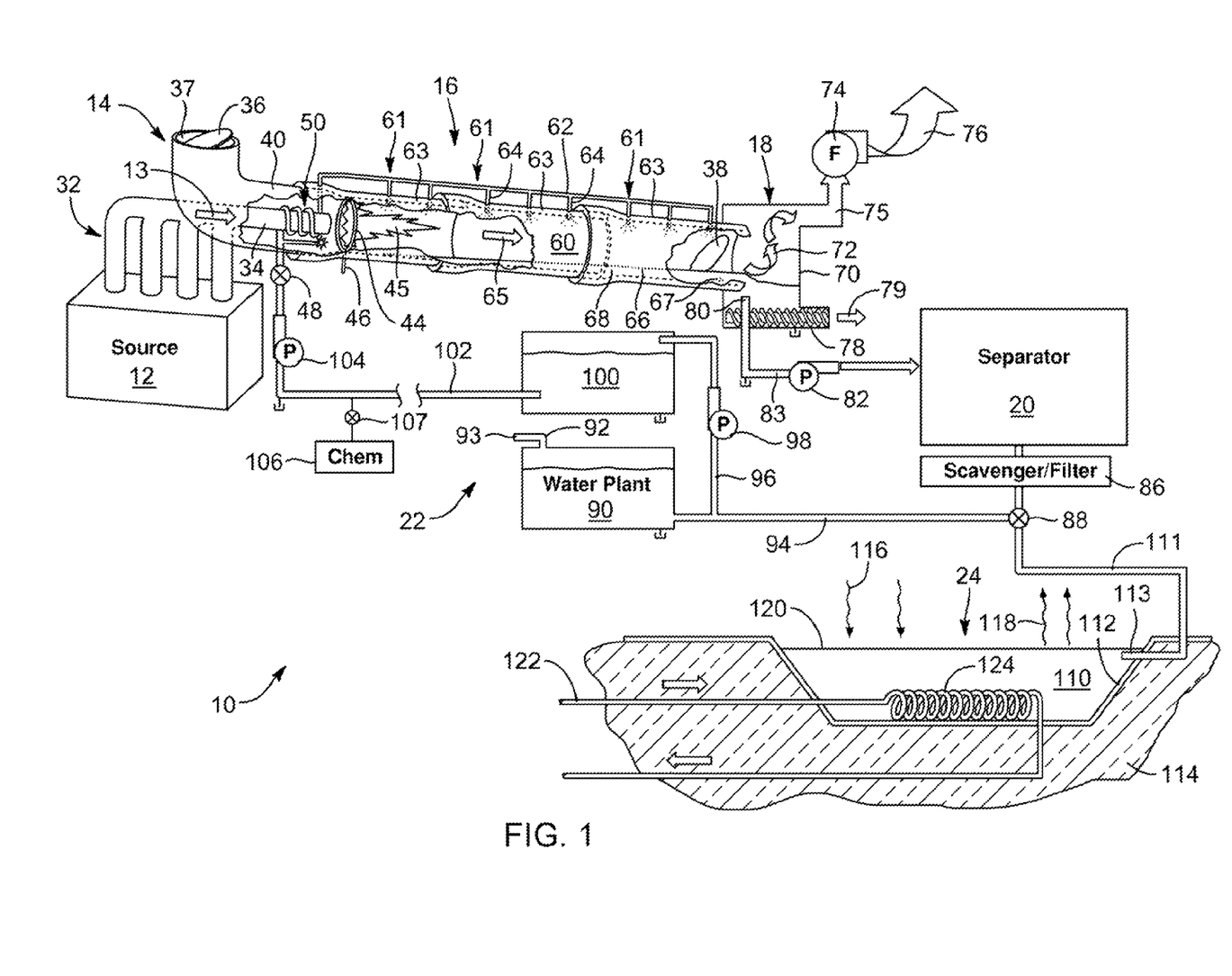
FIG. 1 is a schematic block diagram illustrating one embodiment, including several optional elements, of an effluent remediation system and method in accordance with the invention.

Referring to FIG. 1, a system 10 may reflect an apparatus 10 or process 10 directed to remediation of effluents, typically associated with production, transport, or both of the materials associated with petroleum production. Typical materials extracted from the earth may include crude oil, natural gas, water, salt water, particulate matter, dissolved solids, noncondensable gases, volatile organic compounds, exhaust gases from heaters, flares, motors, and so forth.

In one embodiment, a source 12 may be a motor, such as a drive motor on a compressor plant, a pumping station, or a lift, or a drive motor installed for another required purpose. In the illustrated embodiment, the effluent from a particular source 12 may pass through a system comprising a regulator 14 or regulating portion 14 that manages back pressure.

For example, a blast furnace provides a very tall chimney that effectively draws air into the furnace with pressure head generated between a tall stack of hot gases and the surrounding ambient of comparatively cooler gases. However, flares and various other stacks associated with petroleum production are not well served by a fixed stack of a single design for establishing the draw pressure.

Accordingly, in certain embodiments in accordance with the invention, the regulator 14 is responsible to control back pressure to which a stack or output of a source 12 is exposed. Such devices as flares used to flare off gases may thus be more carefully regulated to provide more complete and efficient burning, as well as scrubbing of particulates and other constituents from the exhaust.

Likewise, motors can be provided a suitable back pressure for exhaust lines in order to improve their thermodynamic efficiency of operation, while still providing effective scrubbers and recovery devices. In several embodiments of apparatus and methods in accordance with the invention, a scrubber 16 may be provided with several heating characteristics.

For example, in certain embodiments, a scrubber 16 may serve as a horizontal stack, rather than relying on vertical stacks such as are used in conventional power plants, exhaust systems, furnaces, and the like. Moreover, the scrubbers 16 may be built in modular fashion to be assembled in series, parallel, or both, in order to optimize the size of a scrubber 16 to remediate the stack gases or exhaust generated by a particular source 12.

A segregator 18 may connect to an output of a scrubber 16 in various embodiments of apparatus and methods in accordance with the invention. The segregator 18 may serve to recover heat, mass, and so forth. In separating out various forms of materials, for example, the segregator 18 may support separation of water from volatile organic compounds, vapors from liquids, dissolved or precipitated solids from liquids, and so forth.

Notwithstanding the use of a segregator 18, various separators 20 may also connect to further separate constituents of various flows. For example, a separator 20 may be responsible to separate vapor from liquid, noncondensable gases from liquids, trace materials from a liquid stream, and the like. In one example, a separator 20 may be as simple as a system to separate water vapor from liquid water while permitting certain noncondensable gases to work their way out of solution.

Likewise, separators may also provide for scavenging of certain trace chemicals. Separators may filter entrained solids before liquids are further processed. In some respects, a segregator 18 and separator 20 may serve similar functions.

Nevertheless, in the illustrated embodiment, the segregator is tasked with managing the entire stream of effluents from a scrubber 16, isolating vapors from liquids, providing an output from precipitated or entrained, entrapped solids, and removing volatile organic compounds. With the regulator 14, or as a part thereof, it may aid in maintaining an optimized flow of ambient air with the exhaust received from a source 12. Back pressure maintenance may optimize the thermodynamic efficiency or other performance of the source 12. Flow and pressure controls may aid in optimizing the remediation processes of the scrubber 16.

In general, a system 10 may include a water supply 22. The water supply 22 may include multiple containers (e.g., tanks, vessels, ponds, etc.) and may typically be fed by production of water from wells, such as oil, gas, or other types of wells. Also, water may be provided from a clean source. Nevertheless, in one typical embodiment contemplated, production water (also called production brine) may result from a petroleum extraction process. Accordingly, the remediation of the brine may be integrated in a system 10 in accordance with the invention to handle both the brine and the waste heat from production, transport, or both processes.

In certain embodiments, a salt pond 24 may form a component in the system 10, whether an apparatus 10 or a process 10. For example, a salt pond 24 may be assembled as an evaporation pond to evaporate the final liquid constituents in a concentrated brine originating from production water. In alternative embodiments, the salt pond 24 may be a stratified, salt gradient solar pond that provides solar collection. Moreover, a salt pond 24 may be engineered in certain embodiments to be as simple as a contained evaporation location to remove water from solids. On the other hand, the salt pond 24 may be a sophisticated container providing heat from solar radiation, salt stabilization of inverted double gradients (i.e., lightest layer highest, yet hottest layer lowest), a heat collection source, a combined solar and rejected heat collector with heat addition all winter from the source 12 keeping the pond 24 operable through all seasons, or the like.

In general, the salt pond 24 may be as simple as the termination of a flow of a liquid, slurry, or the like that will eventually evaporate all liquid so that solids may be disposed of with a simpler, solid material handling mechanism. On the other hand, the salt pond 24 may be as sophisticated as a complex energy addition mechanism for solar collection supporting other energy needs in the processes of the system 10.

Referring to FIG. 1, while referring generally to FIGS. 1-9, a regulator 14 may include or otherwise connect to a manifold 32. A manifold 32 may consolidate the flows from multiple exhaust stacks from various sources 12. The sources 12 whose exhaust effluents are consolidated by the manifold 32 may be of the same or of different types. For example, sources 12 may include a motor, a heater, a flare, stack, or the like.

However, it may be most common and simplest to consolidate in any manifold 32 the exhaust effluents from several sources 12 into a single pipe. Thus, back pressures can be optimized within the regulator 14 and scrubber 16 to improve the efficiency of the operation of the source 12.

A manifold 32 may feed exhaust gases into multiple lines 34, or a single line 34. In the illustrated embodiment, the line 34 forms an inner line 34 that may operate as a jet or an eductor.

Meanwhile, a damper 36 may be used in various embodiments to control flows, pressures, and the like. For example, the damper 36 may operate as an upstream damper 36 regulating the resistance that the opening 37 presents to the induction of ambient air. Meanwhile, various downstream dampers 38 may be located elsewhere, including within the scrubber, at the terminus of the scrubber 16, at other locations about the scrubber 16, and the like.

In general, the eductor 42 or eductor portion 42 of the system 10 will involve a line 34 providing a flow having some initial momentum. Meanwhile, the outer line 40 provides another surrounding body of gas that exchanges momentum with the flow from the inner line 34. Accordingly, the flow from the inner line 34 educts a flow in the outer line 40.

The dampers 36, 38 may control resistance, and thus the net flow, into and out of the scrubber 16. The mixture or proportions of the gas flows from the inner line 34 and the outer line 40 may be controlled by suitable operation of one or more of the dampers 36, 38.

By control of the dampers 36, 38, the flow and the back pressure presented by the scrubber 16 as "seen" by the manifold 32 and the exhaust flow 13 generally, may be precisely controlled. In certain embodiments, a microprocessor or computer connected to sensors in any of the source 12, the manifold 32, the outer line 40, the inner line 34, the scrubber 16, near the damper 36, near the damper 38, downstream of the damper 38, and so forth may precisely monitor and regulate the pressure profile and back pressure. Thus, efficiency of the operation of the source 12 may be improved.

For example, if the source 12 is a diesel engine driving a pump, then back pressure may be very important to the efficiency of operation of the engine 12. However, if a source 12 is a flare, then regulation of the back pressure within the scrubber 16 may control the temperature, the stability of the flame, the overall time controlling combustion completion or efficiency, or the like. Likewise, if the source 12 is a heater for improving the viscosity of oil to be pumped in a transport line, then the back pressure in the scrubber 16 may assist in improving combustion efficiency and temperature regulation in the combustion chamber of the heater 12.

A computerized controller may be programmed to operate the positioning of, and thus the distribution of flow presented by, each of the dampers 36, 38 in a system 10. Likewise, the computerized controller may also read other engine 12 or other source 12 parameters such as speed, exhaust flow, exhaust temperature, and the like in order to provide an integrated solution to optimizing the back pressure at which the scrubber 16 operates.

In certain embodiments, the inlet of the scrubber 16 may actually contain an initiator 44 to introduce gas that will burn as a flare 45 within the scrubber 16. For example, the source 12 may be a flare external to the scrubber 16, but whose exhaust is regulated by the back pressure presented by the scrubber 16. Alternatively, the flare may actually be created by introduction into the inlet 46 of gas flared off downstream of the initiator 44.

In yet another alternative embodiment the initiator 44 may simply be a burner 44 maintaining a flare 45 in order to promote burning of unburned hydrocarbons from a source 12. Engines 12, heaters 12, flares 12, and the like may all burn their respective hydrocarbon fuels incompletely. One mechanism for eliminated volatile organic compounds from the exhaust stream 13 is by using an initiator 44 to maintain a flare 45 promoting combustion of any unburned hydrocarbons entering the scrubber 16.

In certain embodiments, a valve 48 may provide metering or other control and introduction of water into the regulator 14. Typically, the water may pass through the valve 48 to enter a preheater 50. The preheater may be as sophisticated as any heat exchanger made, or may be as simple as a coil carrying water around the periphery of the inner line 34. Alternatively, the preheater 50 may be a coil or heat exchanger exposed directly to the exhaust flow 13 either within the inlet 34, or after exit into the outer line 40. If a flare 45 is to be maintained, then the preheater 50 may actually be placed somewhere within the flare 45 to take advantage of heat generated by the flare 45, for example to preheat the water for use in the scrubber 16.

Figure 7:
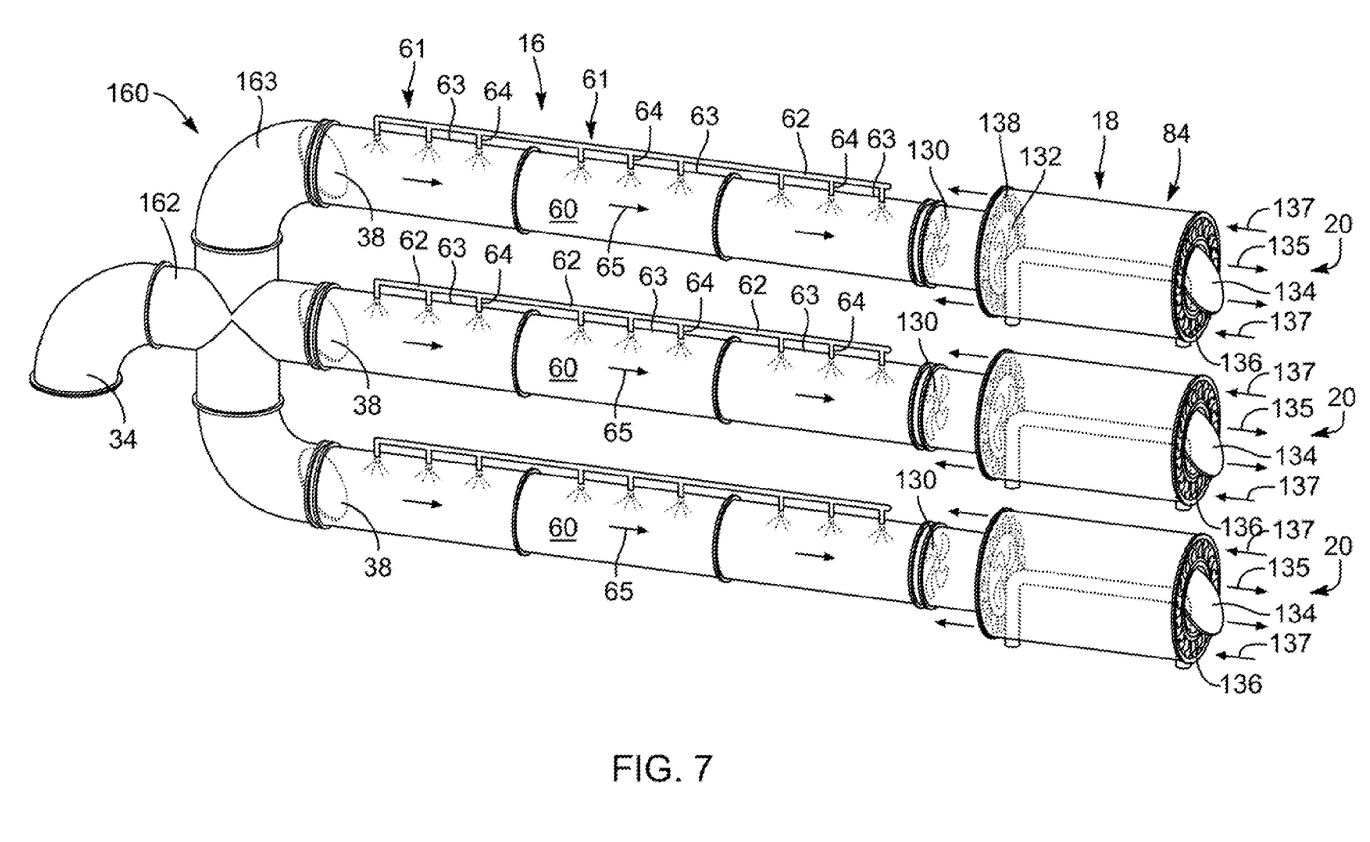
FIG. 7 is a perspective view of one embodiment of a remediation apparatus and method in accordance with the invention modularized and implemented through multiple parallel paths.

The scrubber 16 may include a conduit 60. Typically, the conduit 60 may be formed in modules 61. In the illustrated embodiment of FIG. 1, the modules 61 are connected in series. Meanwhile, connection of modules 61 in parallel may also serve as illustrated in FIG. 7. In a large installation, modules 61 may be assembled both in series and in parallel. Thus, according to the flow of effluents in the exhaust stream 13, modules 61 may be arranged in parallel to handle as much volumetric flow as needed. The length of scrubbing may be engineered as required to effectively complete that process by way of a series assembly of modules 61.

In one embodiment, a feed 62 or line 62 may feed scrubbing water into the scrubber 16. In some embodiments, the line 62 may be a continuing extension of the preheater 50. For example, water may come in through the valve 48, through the preheater 50, and ultimately be delivered into the line 62 supporting the sprays of water into the scrubber 16.

Typically, the line 62 may penetrate the walls 63 with either extensions or nozzles 64 spraying an atomized mist of water into the flow 65 of exhaust 13 passing through the scrubber 16. On one hand, the heat within the flow 65 will tend to evaporate some amount of the water sprayed through the nozzle 64 into the flow 65. On the other hand, the latent heat of vaporization of the water spraying from the nozzles 64 may absorb a comparatively large amount of heat from the flow 65 of exhaust gases.

The combination of cooling the flow 65 and exposing it to a heavy volume of water mist through which it must flow will scrub out particulates and other materials other than air. In reality a certain amount of air, (considered a noncondensable gas) will also be absorbed according to the laws of equilibrium chemistry controlling all absorption in the system 10.

Ultimately, the flow 65 will be substantially scrubbed of materials that are desired to be separated rather than discharged into the environment. As a practical matter, the modules 61 may be assembled in series to a length selected to provide the percentage of removal of effluents, particulates, or other pollutants from the flow 65. As a result, those scrubbed materials, whether solids, volatile organic compounds, or the like, will typically be associated with (e.g., contained within) the water that eventually drains out of the scrubber 16.

For discharge, a jet 66 of water may urge expulsion of effluents 67 collected by the scrubber 16. Most of the vapors will remain in a vapor state. Those vapors will include organic compositions or compounds, air, and some amount of water vapor. Nevertheless, the cooling effect of the water from the nozzle 64 will tend to minimize the volatile organic compounds in the vapor phase, and render many of them liquids trapped with the water in the effluent 67.

The jet 66 may be installed to provide a sweeping of the bottom surfaces of the conduit 60 in order to clean liquids, dissolved solids, precipitated solids, volatile organic compounds that have been condensed, and so forth from the scrubber 16 for further processing. Typically, the line 68 feeding the jet 66 may be fresh water, cold water, hot water, recycled brine, or a portion of the water delivered by the preheater 50 from the valve 48.

The segregator 18 may be substantially enclosed within a chamber 70. Typically, a flow 72 into a chamber 70 may be promoted by a driver 74 such as a fan, or other device. A combination of the dampers 36, 38 and the driver 74 may control the relative pressures within the line 40, the scrubber 16, and the chamber 70. A line 75 discharging vapors as a flow 76 from the segregator 18 may be sized and dampered according to the thermodynamic conditions desired within the segregator 18.

Likewise, an optional mover 78 such as an auger 78 may remove precipitated solids or other solids from the bottom of the chamber 70. Entrained solids may arrive from some sources 12. In other situations, particulates may be scrubbed out of the flow of exhaust 65 in the scrubber 16. Various sludges, solids, and the like in combination with the heaviest liquids may combine to be removed by a mover 78. In certain embodiment, the mover 78 may operate entirely underwater. In other embodiments, the mover 78 may involve any particular method of conveyance to draw solids, sludges, or a combination thereof out of the chamber 70 for further processing, disposal, or both.

Typically, combustion processes may leave unburned hydrocarbons. Many of these unburned hydrocarbons are scrubbed out as liquids or solids 79. Soot will show up as a solid, for example. Also, a certain amount of the salt, calcium compositions, or the like may precipitate out as solids 79 and collect in the chamber 70 for removal.

Figures 3, 4:
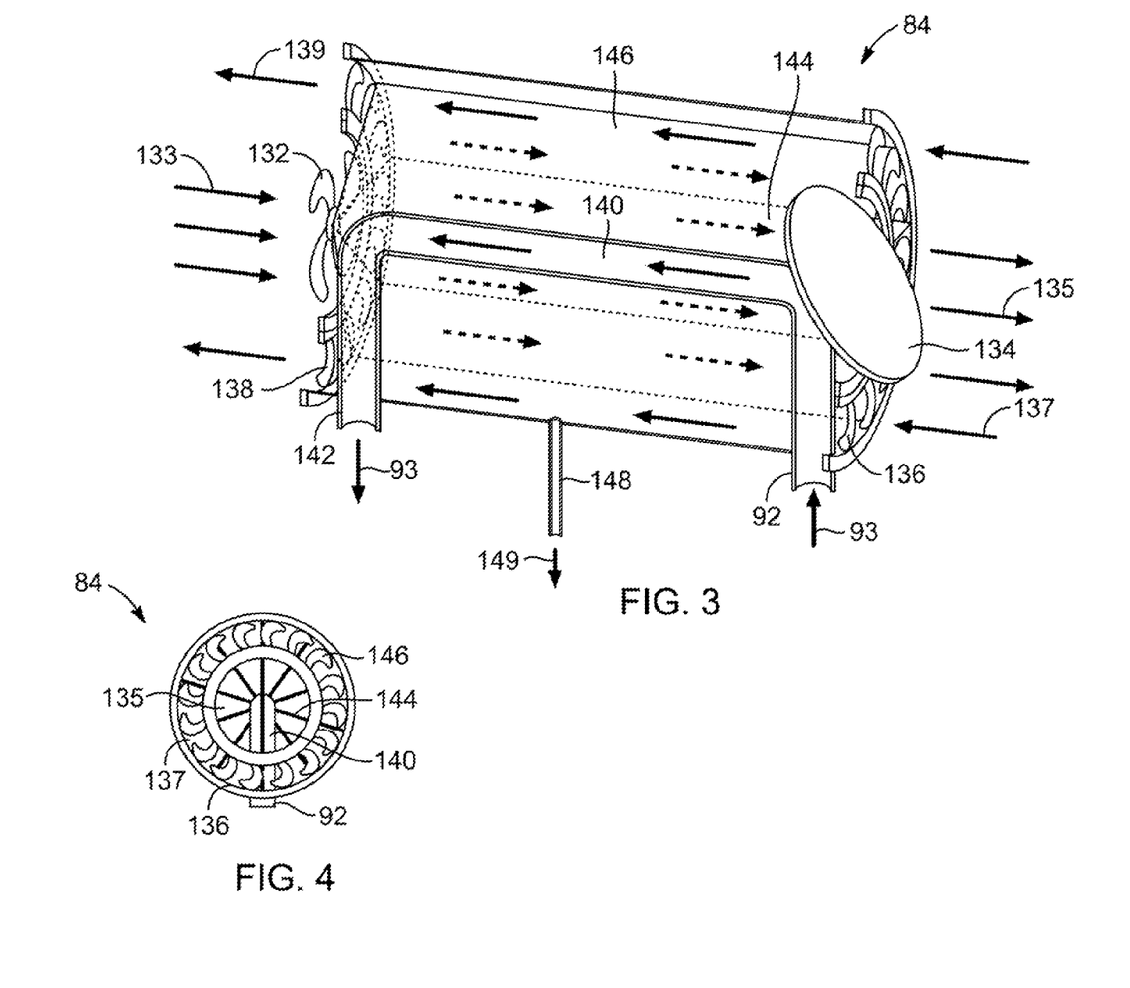
FIG. 3 is a perspective view of one embodiment of a heat exchanger with flow controls and drivers for implementation in certain embodiments of apparatus in accordance with the invention.
FIG. 4 is an end elevation view of the heat exchanger apparatus of FIG. 3.
Figure 9:
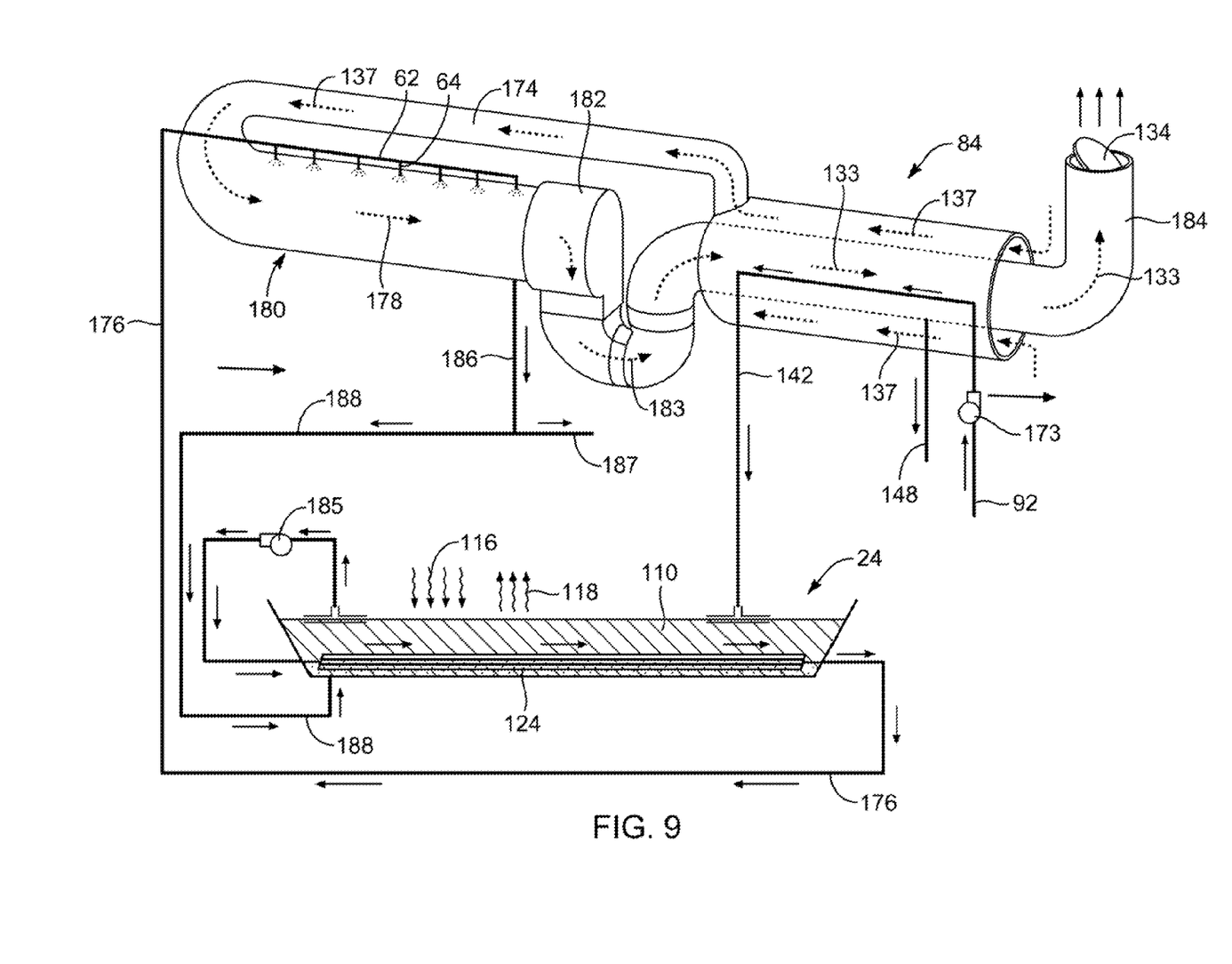
FIG. 9 is a schematic diagram of one embodiment of a remediation system for production water effluent in the absence of sources of exhaust and stack-gas effluents.

In some embodiments, a drain 80 may drain liquids from above the solids 79 collected in the chamber 70 into a pump 82 drawing water, typically a briney water from the chamber 70, through a line 83. As part of the removal of liquids, comparatively cleaner water may be removed from the flow 72 of vapors by inclusion of a condenser 84 within or in association with the chamber 70. Selected embodiments of condensers are illustrated in FIGS. 3, 4, and 9. Likewise, the scrubber 16, itself, may both evaporate liquids and condense them. For example, incoming water from the nozzles 64 may be preheated, and may be evaporated regardless by the flow 65 of hot exhaust gases through the scrubber 16. By the same token, cooling of the exhaust flows 65 will also tend to precipitate out liquids from combustion by-products.

However, the condenser 84 may be responsible to condense out comparatively clean water. Water that condenses within the scrubber 16 may typically join with the effluent 67 flowing out of the scrubber 16. By contrast, water vapor sent through the condenser 84 may be separated as a vapor, and then condensed as a comparatively clean flow of water.

A separator 20 may provide separation of liquid from noncondensable gases. Likewise, particulates that are slow to settle may be entrained and may be removed by a separator 20 appropriately designed for the task. Likewise, a scavenger 86, filter 86, or the like may remove or remediate the acidity, solid content, noncondensable gases, or the like from the flows received from the line 83 and driven by the pump 82 into the separator 20.

A valve 88 is illustrated schematically, but may be represented by more than one valve in order to provide direction and other control of flows. For example, in the illustrated embodiment an optional salt pond 24 may be fed by some amount of water passing through the valve 88 or controller 88 from the separator 20. Likewise, water may be sent by the valve 88 to the water system 22.

The water system 22 may include one or more reservoirs 90 and may provide a buffer for collection of water. For example, in the illustrated embodiment, an inlet 92 may receive a water flow 93 from production, such as an oil field or gas field. A new reservoir 90 accumulates the water 93 flowing into it, and together with the line 94 from the separator 20 may feed water into the line 96 and the pump 98. Thus, the reservoir 90 may provide a buffer against requiring pressure head regulation and water as needed by the pump 98.

Meanwhile, a reservoir 100 may feed water through a line 102 to a pump 104 as the source water for the nozzles 64. The line 102 feeds the water through the valve 48 supplying the optional preheater 50, the lines 62 servicing the spray nozzles 64, and, optionally, the line 68 feeding the jet 66 sweeping the scrubber 16.

In some embodiments, a feeder 106, such as a chemical feeder 106 may provide through a valve 107 a metered, or otherwise controlled supply of treatment chemicals. For example, in certain embodiments, sulfurous acid may be introduced into a flow of water. In other embodiments, other chemical treatments may be fed by the feeder 106 to modify the chemical constitution of the water flow introduced through the nozzles 64.

Referring to FIG. 1, while referring generally to FIGS. 1-9, a salt pond 24 may be instantiated one or more times, in parallel or series, as an optional remediation measure or an energy source for the system 10. In the illustrated embodiment, a salt pond 24 may be configured as a salt gradient solar pond. In other embodiments, the salt pond 24 may merely be used as an evaporation pond without any collection of heat or extraction of heat therefrom into supported processes in the system 10.

In one embodiment, the pond 24 may include a solution 110 of brine, graduated with increasingly salinity nearest the bottom of the pond 24. Accordingly, the lowest levels of salinity exist near the surface 120 of the pond 24. The physical weight of the higher concentration brine is sufficient to overcome the effects of density change due to temperature variations. Thus, a salt pond 24 may have a gradient of increasing density from top to bottom, with a gradient of increasing temperature from bottom to top. The increase in density due to the salt overcomes the decrease in density due to heat.

Meanwhile, a line 111 feeding into the pond 24 may fill a liner 112, such as an impermeable geotechnical lining material 112 through an outlet 113 near the surface 120 thereof. The operation of the scrubber 16 may be engineered to assure that sufficient heat is still contained in the water discharged by the outlet 113 to maintain the surface 120 of the pond 24 capable of remaining liquid, and not freezing solid. Therefore the pond 24 may operate year-round in cold climates.

In general, the salt pond 24 or solar pond 24 may be formed in a surrounding soil 114 supporting the impermeable liner 112. Plus, a salt pond 24 may actually be a very effective solar collector. Solar radiation 116 received into the pond 24 may be absorbed within the water, and ultimately may be absorbed most completely and readily near the bottom of the pond 24. If the waters of the pond 24 are substantially clear, then radiation 116 may pass substantially through the solution 110 to be absorbed at the bottom of the pond by the liner 112. Thus, the liner 112 may actually be a substantial source of heat within the pond 24.

Again, the pond 24 may be engineered to have a depth suitable for promoting absorption of solar radiation 116 near the bottom thereof. To the extent that particulates, gas bubbles, or the like tend to cloud the solution 110, the solar radiation 116 may be absorbed throughout the solution 110.

Evaporation 118 of water from the surface 120 of the pond 24 will occur at substantially all temperatures. Nevertheless, warmer temperatures include evaporation 118. Even without the solar radiation 116 into the pond 24, evaporation 118 may be promoted year round by the control of the temperature at the outlet 113. The ratio of exhaust flow 65 compared to the water flow through the nozzles 64 may be used as one engineering parameter to control the output temperature of effluent water in the line 111 delivered by the outlet 113.

In certain embodiments, an optional line 122 may feed into a heat exchanger 124 near the bottom of the pond 24. To the extent that solar or other heat will collect in the pond 24, a certain amount of that heat may be collected by a heat exchanger 124 and transferred into water of the line 122. Including a line 122 and a heat exchanger 124 in the salt pond 24 is completely optional. However, in the illustrated embodiment the line 122 may be an extension of the line 102.

For example, the line 102 may run from the reservoir 100 to become the line 122, feeding the heat exchanger 124, ultimately conducting water back into the pump 104. Thus, water from the reservoir 100 may be preheated initially by the heat exchanger 124 extracting heat from the salt pond 124, and again by the preheater 50 extracting heat from the exhaust flow 13 received through the line 34. The amount of water, the amount of pre-heating, and the like may be controlled by suitable control of the flow of water through the lines 102, 122, 62.

Figure 2:
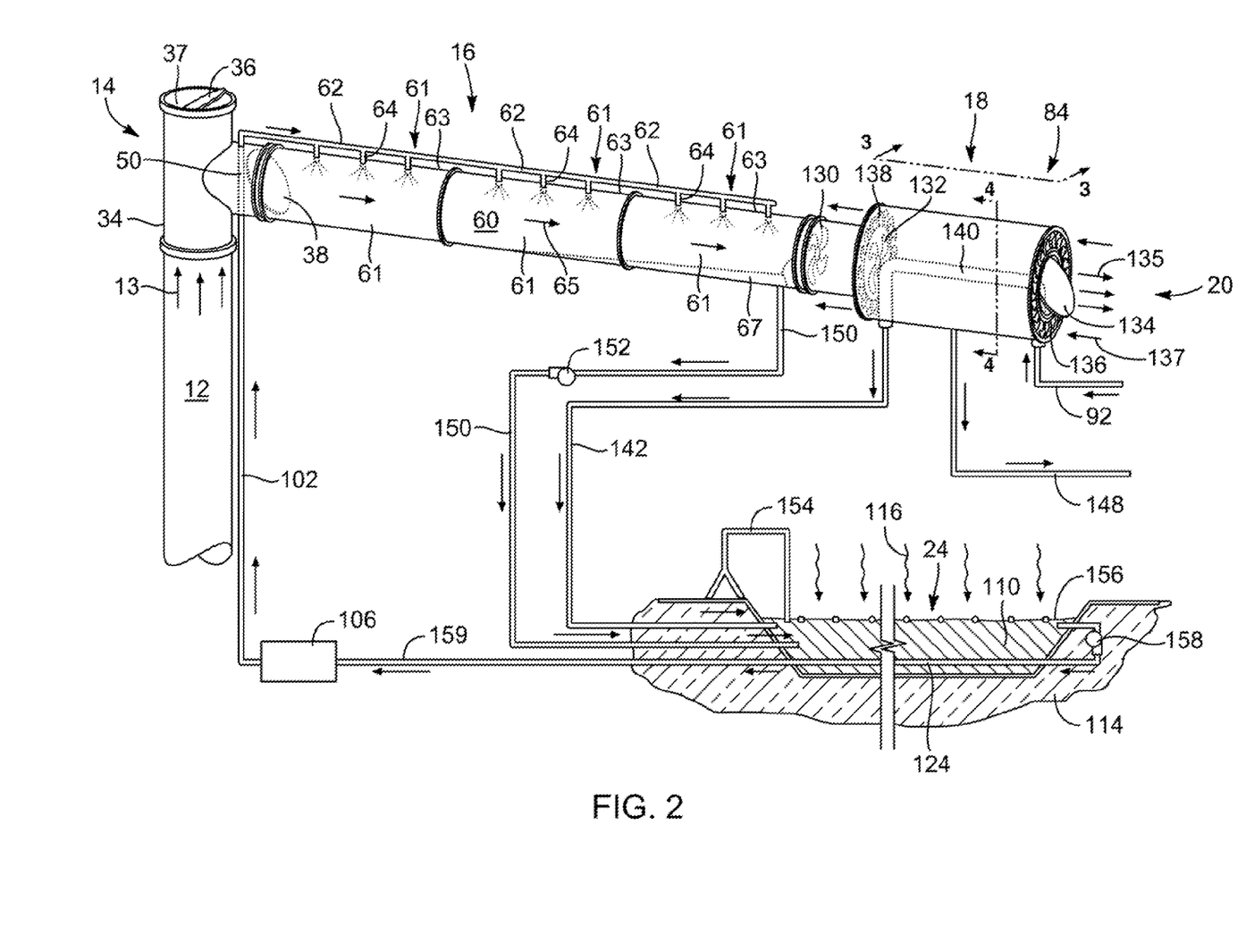
FIG. 2 is a schematic block diagram of another alternative embodiment of a remediation system in accordance with the invention.

Referring to FIGS. 2-4, while continuing to refer generally to FIGS. 1-9, a source 12 may feed a stream line exhaust 13 through a line 34 servicing a scrubber 16. The exhaust 13 may be sealed completely, or may be augmented by a flow through an inlet 37 controlled by a damper 36. In some embodiments, the inlet 34 may serve as an emergency vent to vent the exhaust 13 from the source 12. Thus, in such an operational mode, the damper 36 may simply provide a mechanism to control venting the exhaust 13 to the environment. For example, when the system 10 is off line, exhaust 13 may still flow as before.

In other embodiments, the inlet 34 may be controlled by the damper 36 to mix flows from the exhaust 13 with ambient air to be fed into the scrubber 16. In general, the conduit 60 may be built in modules 61, connected together according to the size of the system 10 required. The conduit 60 may conduct a flow 65 exposed to water droplets sprayed from the nozzles 64. Typically, a damper 36 may control inlet air while a damper 38 may control the flow of outlet air. As a practical matter, all flows must balance. Nevertheless, by manipulation of the dampers 36, 38, pressure differentials between various points in the flow 65 may be controlled.

For example, in one embodiment, a damper 38 may be moved farther downstream to effectively become a damper 134. In such an embodiment, a fan 130 may draw vapors from the scrubber 16, thus reducing pressure in the scrubber. In the illustrated embodiment, the damper 38 near the inlet to the scrubber 16 may assure that a proper back pressure is applied to the exhaust 13 coming from the source 12.

Meanwhile, the combination of the damper 38 and the fan 130 may provide a reduced pressure within the scrubber 16, promoting reduced pressure and higher rates of evaporation.

These higher rates of evaporation may result in a flow of vapors from the scrubber into a condenser 84. In the illustrated embodiment, the condenser 84 may be, or may be part of, a segregator 18.

In the illustrated embodiment, vapors from the scrubber 16 are driven by the fan 130 into the condenser 84. Traveling along the central portion of the condenser 84, the vapors are compelled or impelled by the fan 130 against the restriction of the damper 134. As a practical matter, the fans 130, 132 may be the same fan. In other embodiments, the fan 130 may be responsible to draw down the pressure in the scrubber 16.

The fan 32 may be responsible to drive up the pressure inside the condenser 84. In either event, the fan 130 draws against the restriction of the damper 38 to reduce the pressure in the scrubber 16, while the fan 132 drives against the restriction of the damper 134 downstream to increase the pressure within the condenser 84. The exhaust 133 into the condenser 84 is thus elevated in pressure inside the condenser 84. This increased pressure tends to increase the tendency of water vapor to condense therein.

As a practical matter, noting the effluent 67 collected within and exiting the scrubbers 16, various changes in elevation, offsets, and the like may be appropriate for the conduit 60 as it transfers the vapors from the scrubber 16 into the condenser 84. Thus, for example, vapors may be drawn out through a higher exit point, while effluents trapped in the liquid 67 may be passed out through a lower location.

In the illustrated embodiments of FIGS. 1-8, and more particularly FIGS. 2-4, and 7, the exhaust flow 133 into the condenser 84 may be driven by the fan 132 or other pressurizing means 132 against the restriction of the damper 134 to create a condensing pressure within the condenser 84. Thus, the exhaust 135 exiting the central portion of the condenser 84 will be dryer, having given up the portion of its moisture as condensate removed from the condenser through the line 148.

A fan 136 may drive an air flow 137 into the outer portion of the condenser 84. Optionally, another fan 138 may draw air out of the condenser 84. In the outer portion of the condenser 84, the air is not condensed, but rather picks up heat through heat exchange with the inner portion of the condenser 84. Thus, the air flow 139 exiting the outer portion of the condenser 84 has received some of the heat from the exhaust 133 entering the center portion of the condenser.

Of course, in alternative embodiments, various types of heat exchangers may replace the condenser 84. For example, the exhaust 133 may flow through the outer portion of the condenser 84. Likewise, an entirely different type of heat exchanger may be used for the exchange of heat and condensation of water vapors from the exhaust flow 133.

The water flow 92 into the condenser may remove heat from the condensing and cooling exhaust 133 passing through the condenser 84. For example, the inlet line 92 may bring water from a particular source, such as production water, into the condenser 84. This water flow 93 into the line 92 (e.g., a heat exchanger of any suitable type) may pass through the hottest portion of the condenser, surrounded or otherwise exchanging heat with the surrounding exhaust flow 133. Thus, the line 140, may actually be multiple lines, finned, or another heat exchanger configuration. It may be a complete heat exchanger in its own right, heating the water 93 passing therethrough. Ultimately, the water 93 exiting the line 142 out of the condenser has been heated by both sensible and latent heat given off by the constituents of the exhaust flow 133. Thus, the exhaust flow 135 is typically cooler and has lost moisture condensed and drained out through the line 148.

In certain embodiments, fins 144 may protrude into the exhaust flow 133 to improve a heat transfer into both the line 140 containing water as well as into the outer portion of the condenser 84 conducting the air flow 137. Similarly, fins 146 may pass into or through the outer portion of the condenser 84 to contact the air flow 137 passing therethrough. Thus, the air flow 139 exiting the condenser will be heated.

In certain embodiments, the airflow 137 may be the entire cooling mechanism for the condenser 84. In other embodiments, the water flow 93 may be the entire coolant for the condenser 84. In yet other embodiments, both the water flow 93 and the air flow 137 may provide cooling for the exhaust stream 133 passing through the condenser 84.

Although a finned heat exchanger has been illustrated, other embodiments of heat exchangers may also serve to good effect. One benefit to the heat exchanger as illustrated is simplicity in fabrication. It provides both physical stiffness and heat exchange by the concentric-cylinder-and-fin construction of the condenser 84, and easy access for cleaning. Likewise, comparatively thin (e.g., sheet) materials may be used to reduce weight, while still providing comparatively simple access for cleaning and the like.

A condensate line 148 may carry condensing water drained from the condenser 84. The flow 149 of water exiting the condenser 84 through the line 148 may be treated if necessary, but provides a source of fresh water. For example, salts and solids do not evaporate nor condense. Accordingly, such will be flushed out with the effluent 67 from the scrubber 16, rather than passed on as water vapor into the condenser 84. This supply of clean water flow 149 may be directed to other uses away from those of the brine from the line 142.

The line 142 may feed the salt pond 24 as described hereinabove. Likewise, the effluent 67 may be swept out through the line 150 into the salt pond 24. In yet other embodiments, the line 142 may be connected directly to feed the line 62 to the scrubber 16. In the illustrated embodiment, both the brine introduced by the line 150 into the lower portion of the pond, and the unconcentrated brine water from production passing through the line 142 into the salt pond 24, support the solution 110 in the pond 24. Both may be served by the pump 158 into the lines 159, 102 supporting the inlet line 62 to the scrubber.

In the illustrated embodiment, the various pumps 152, 158 may be augmented or replaced by gravity. Nevertheless, some mechanisms for motivating the flows of liquids throughout the system, must be engineered to provide the transfer of mass necessary to support the system 10. In certain illustrated embodiments, a skimmer 154 may also be installed in the salt pond 24. For example, certain hydrocarbons may still remain in the effluent 67, and be discharged into the salt pond 24. These hydrocarbons may be recovered by the skimmer 154 at the surface 120 of the salt pond 24 as they rise to the surface 120.

In certain embodiments, a grid 156 or other mechanism for suppressing waves may be installed to float or otherwise locate at the surface 120 of the pond 24. Suppression of waves assists in maintaining a graduated concentration of the solution 110 by limiting mixing in the pond 24. Just below the surface 120 of the pond 24, water having the lowest salinity may be withdrawn from the pond 24 to supply the inlet line 162 servicing the nozzles 64. In the illustrated embodiment, the pump 158 may pump water through the line 159 and any chemical treatment 106 required toward the final line 102 feeding the preheater 50 and the feed line 62.

Again, as in alternative embodiments, any of the embodiments of the apparatus and methods in accordance with the invention may include the various other constituent parts including multiple salt ponds 24, multiple water reservoirs 90, 100, preheaters 50, heat exchangers 124, chemical treatments 106, sweep jets 66, other components of the segregator 18, and so forth. For clarity, not all optional components can be illustrated with respect to every embodiment. Nevertheless, it is contemplated that each and every of the components not inconsistent with one another may be used in combination as an engineered solution to the problem of remediation of various effluents. Effluents may include any one or more of heat, water, salts, other dissolved solids, particulate matter, volatile organic compounds, hydrocarbon particulates, and so forth.

Figure 5:
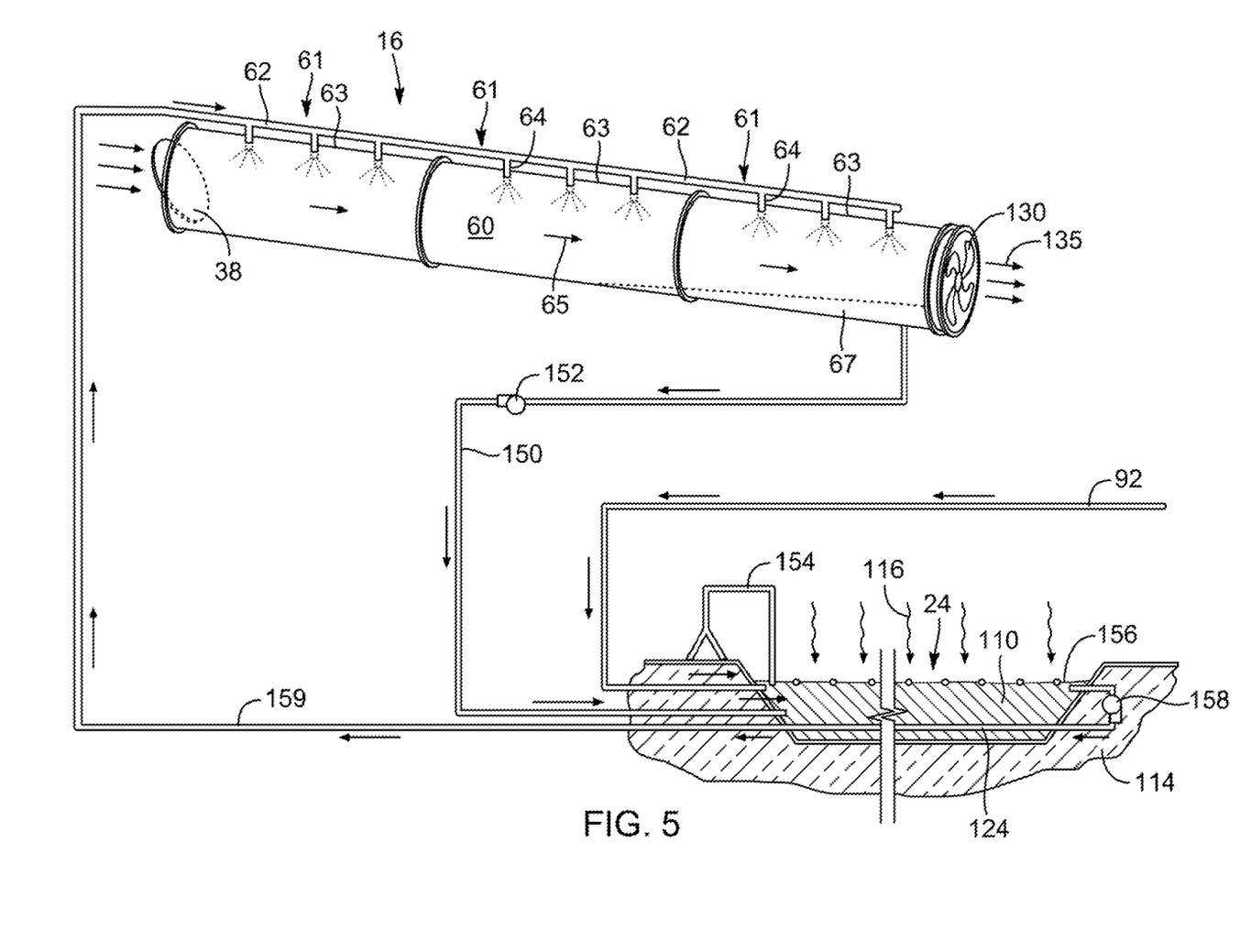
FIG. 5 is a schematic block diagram of an alternative embodiment of a remediation system in accordance with the invention.

Referring to FIG. 5, while continuing to refer generally to FIGS. 1-9, the system 10 may dispense with the segregator 18. Instead, the skimmer 154 may recover hydrocarbons floating on the salt pond 24, while the salt pond 24 ultimately receives all brine. In the embodiment of FIG. 5, the concentration of brine in the effluent 67 simply continues, while the concentrated brine is retrieved from the salt pond 24 by the pump 158. Thus, the condenser 84 and other mechanisms for serving the means of a segregator 18 may largely be dispensed with, or integrated into the pond 24 if warranted.

Figure 6:
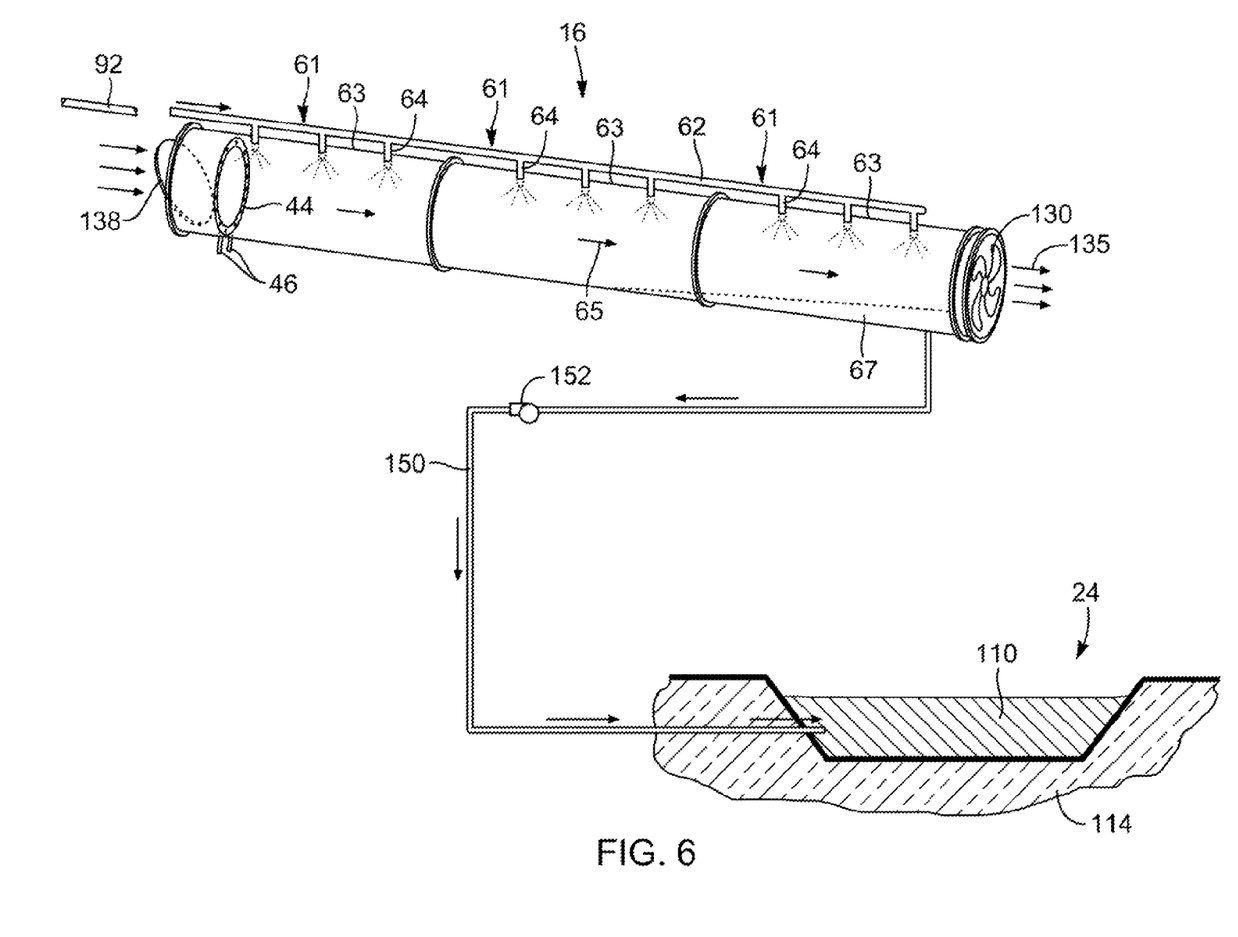
FIG. 6 is yet another, more simplified embodiment of a remediation apparatus and method in accordance with the invention.

Referring to FIG. 6, while continuing to refer generally to FIGS. 1-9, another even more simplified version of the system 10 in accordance with the invention may pass effluent 67 directly through a line 150 into a pond 24 maintained merely for evaporation. Thus, none of the recycling of heat from solar collection, none of the brine concentration, and so forth are required in some circumstances, in order to still provide remediation by the scrubber 16. In the embodiment of FIG. 6, for example, the damper 138 still provides a needed control of back pressure for combustion in the combustion chamber of a source 12. Meanwhile, the evacuation of the scrubber 16 by the fan 130 against the resistance of the damper 138 provides low pressure, improved evaporation, and thus discharge of larger volumes of water vapor, cleaned and salt-free, into the atmosphere. Meanwhile, salts and other solids are passed into the evaporation pond 24 for ultimate disposal.

Referring to FIG. 7, a manifold 160 may connect the incoming line 34 from a source 12. Thus, a divider portion 162 may connect to various fittings 163 feeding into parallel scrubbers 16 or conduits 60. Thus, the various number of modules 61 in each scrubber 16 may be selected according to the criteria for scrubbing undesirable materials into the effluent 67 from the exhaust flow 13. Meanwhile, the number of scrubbers 16 fed by the manifold 160 may be selected according to the overall volume of flow generated in the exhaust stream 13 of the various sources 12 feeding the system 10.

Figure 8:
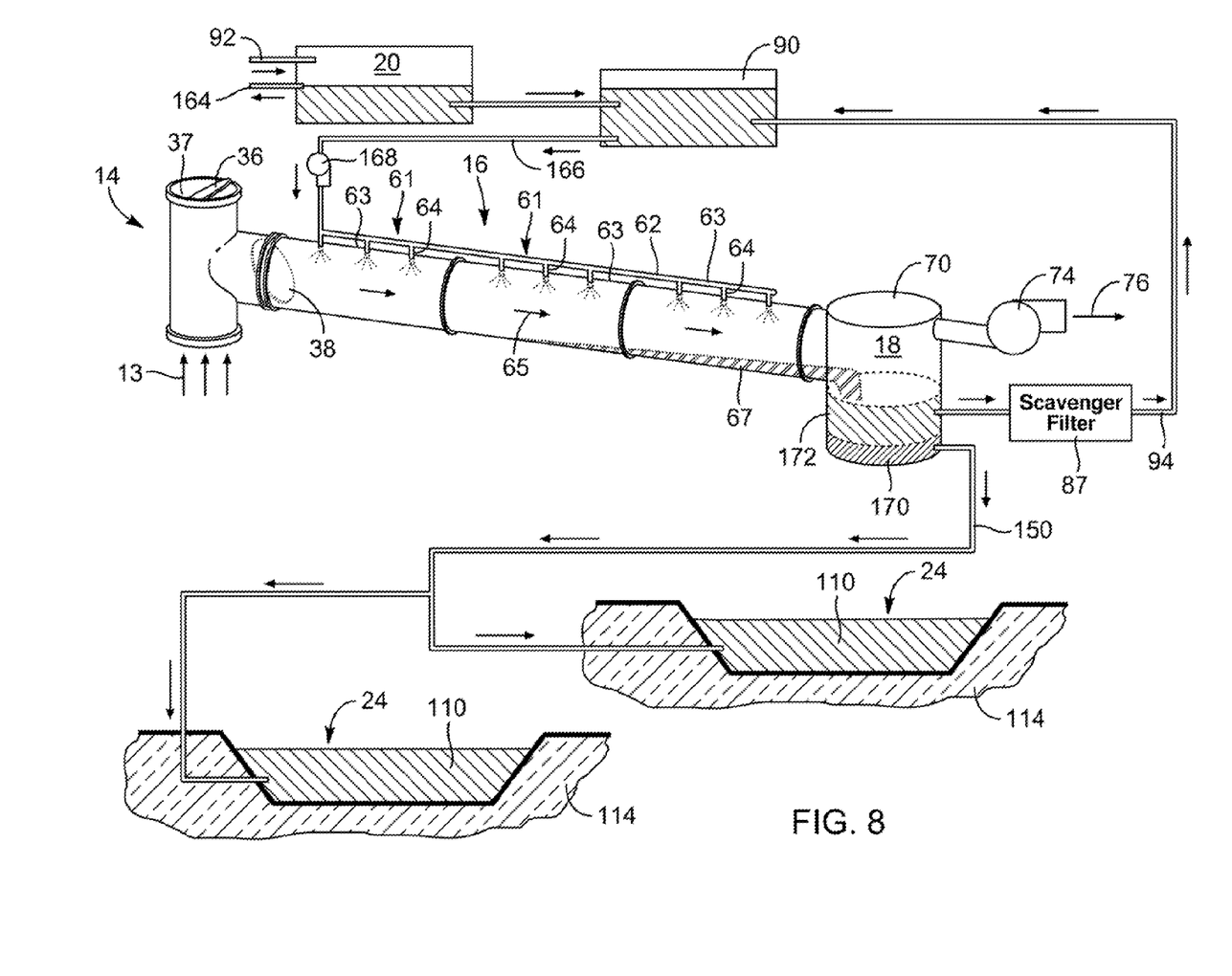
FIG. 8 is a schematic diagram of another alternative embodiment of a remediation system in accordance with the invention.

Referring to FIG. 8, while continuing to refer generally to FIGS. 1-9, an apparatus 10 in accordance with the invention may include a scrubber 16 handling an exhaust stream 13 from a source 12. Likewise, a damper 36 may control access to fresh make up air. Pressure in a scrubber 16 may be controlled by a damper 38, and a blower 74 or fan 74. Control may include reducing the pressure in the scrubber 16, providing proper control of back pressure to which the source 12 is exposed, or both. For example, the dampers 36, 38 may control the back pressure to which the source 12 is exposed, while the fans 74 may operate against a restriction of the dampers 36, 38 to reduce the pressure in the scrubber 16.

Meanwhile, the segregator 18 may operate within a closed vessel 70 from which only gases such as water vapor and air exit in the flow 76 driven by the fans 74. Meanwhile, the water separator 20 may act to remove hydrocarbons floating on the surface of captured water, while a line 92 feeds production water from the source. Thus, the water separator 20 may act as an initial separator of water in the line 92 from a production source.

Hydrocarbons condensed and otherwise floating on the top of the water surface may be discharged therefrom. Through the line 164, meanwhile, water from the separator 20 may feed into the reservoir 90. That reservoir serves as a source for the line 166 feeding the pump 168 and the inlet line 62 of the scrubber 16. Brine 170 from the segregator 18 may be directed into the evaporation ponds 24.

Water having a comparatively lower concentration of salts, and substantially reduced or no solids, and with a lower degree of dissolved solids, may then be recycled through the line 94 into the source 90. In some embodiments, vapors 76 containing water and air may be removed from the vessel 70, while the effluent 97 is discharged therein, and various concentrations of brine are removed by the lines 94, 150.

Referring to FIG. 9, while continuing to refer generally FIGS. 1-9, one embodiment of an apparatus 10 and method 10 in accordance with the invention may remediate production water using less energy, and not relying on a source 12. For example, in some locations, production water may exist in the absence of any appreciable heat from a source 12 such as a heater, motor 12, or flare 12.

In the illustrated embodiment of FIG. 9, source water from production may flow in through a line 92, driven by a pump 173 to the condenser 84. Remediated water may exit through the line 142 to be discharged to a pond 24. In the illustrated embodiment, the direction of flow may be modified, and damped to assure minimization of mixing between lower concentrations and higher concentrations of brine in the pond 24. Thus, the pond 24 may be a stratified, salt gradient solar, pond.

Meanwhile, air from the ambient may enter the condenser 84 as a flow 137 in a direction contrary to that of the exhaust flow 133. Nevertheless, in the illustrated embodiment, the air flow 137 through the condenser 84 passes out into the line 174. There, the air flow 137 is conducted to the opposite end of the apparatus 10. There it is introduced to atomized water through the nozzle 64, fed by the line 62. Thus, the flow 178 becomes a combination of both an incoming air flow 137 and moisture. Moisture may include atomized, liquid water, vaporized water, or all the foregoing, as a result of introduction by the nozzle 64 of a misting spraying.

The flow 178, flowing through the evaporator 180 is drawn, driven by the blower 182 or compressor 182. The blower 182 tends to evacuate and reduce the pressure within the evaporator 180. This drop in pressure promotes evaporation of water from the spray nozzles 64. The flow 178 is then drawn through the line 183 into the inner portion of the condenser 84. As described hereinabove, the condenser 84 provides condensation of a certain amount of the water vapor within the flow 178.

For example, the blower 182 serves to evacuate the evaporator 180 against the resistance generated by the flow path, which may include a damper. Meanwhile, the inflowing air 137 may be exposed to a damper prior to entrance into the outer portion of the condenser 84. Meanwhile, the blower 182 or another also serves to pressurize the inner portion of the condenser 84 carrying the exhaust flow 133. By regulating the damper 134, an individual or a computerized control mechanism may operate to maintain a pressure in the condenser 84 promoting condensation of the water vapor therein.

The heat transferred from the condensing water vapor in the flow 133 is thus transferred into both the incoming airflow 137 and the incoming water in the line 92. Ultimately, any liquid from the line 186 exiting the evaporator 120 may be recycled back into the line 188 feeding into the pond 24.

Meanwhile, the pond 24, while promoting evaporation 118 and solar input 116 as described hereinabove, may be provided with the heat exchanger 124. Water taken from near the surface 120 of the pond 24 may be driven by the pump 185 through the heat exchanger 124 to discharge through the line 176. The line 176 feeds into the feeder 162 or line 162 servicing the nozzles 64 in the evaporator 180. One can see that the preheating by the heat exchanger 124 as a result of the solar radiation 116 absorbed by the solution 110 in the pond 24 provides the heat energy to promote evaporation in the evaporator 180.

Thus, the embodiment of FIG. 9 provides remediation of the brine from source water input through the line 92 and provides a distilled water outflow from the line 148. Line 148 carries the condensate from the condenser 84 pressurized and cooled to provide exactly that condensed water output. Meanwhile, the exhaust flow 133 is passed out past the damper 134 to the environment, cleaned of solids, salts, much of its heat, and so forth.

Meanwhile, the salt gradient in the solution 110 collects and recycles heat, providing and recovering the latent heat of vaporization put into the evaporator 180 and extracted back out of the condenser 84.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for remediating outputs from petroleum production, the method comprising:
    selecting an energy source;
    receiving an exhaust from the energy source, the first exhaust containing heat, nitrogen, compounds of sulfur, particulates, and unburned hydrocarbons;
    reducing formation of oxides of nitrogen by controlling back pressure on the energy source dynamically;
    reducing the unburned hydrocarbons by exposing the first exhaust to an open flame;
    capturing, into a liquid, at least a portion of the compounds of sulfur and the heat by conducting the exhaust through a scrubber spraying the liquid into the flow of the exhaust;
    evaporating to vapor at least a portion of the liquid;
    releasing the vapor into the environment, the vapor being substantially free of entrained solids and dissolved solids;
    recycling at least a portion of the heat from the liquid exiting the scrubber into the liquid entering the scrubber; and
    discharging the liquid into a containment.

2. The method of claim 1, wherein the energy source comprises a machine combusting a hydrocarbon fuel.

3. The method of claim 2, wherein the machine is selected from an engine, a flare, and a heater.

4. The method of claim 3, wherein controlling back pressure further comprises at least one of operating a damper controlling flow through the scrubber and operating a blower augmenting flow through the scrubber.

5. The method of claim 4, wherein the liquid comprises water.

6. The method of claim 5, further comprising increasing the evaporating by reducing pressure in the scrubber below ambient pressure.

7. The method of claim 6, further comprising recycling at least a portion of the heat from the liquid exiting the scrubber into the liquid entering the scrubber.

8. The method of claim 6, further comprising providing both the liquid and the hydrocarbon fuel as production flows from petroleous production.

9. The method of claim 1, wherein the energy source comprises a device selected from an engine, a flare, a heater, and a dedicated burner feeding the exhaust to the scrubber.

10. The method of claim 1, wherein controlling back pressure further comprises at least one of operating a damper controlling flow through the scrubber and operating a blower augmenting flow through the scrubber.

11. The method of claim 1, wherein the liquid comprises water.

12. The method of claim 1, further comprising increasing the evaporating by reducing pressure in the scrubber below ambient pressure.

13. The method of claim 1 further comprising providing both the liquid and the hydrocarbon fuel as production flows from the same source of petroleous production.

14. The method of claim 1, wherein the liquid is a brine containing from about 1000 parts per million to about 40,000 parts per million of minerals.

15. The method of claim 1, wherein the scrubber also operates as an evaporator oriented conducting the exhaust substantially exclusively horizontally.

16. The method of claim 1, wherein the scrubber also operates as an evaporator comprising a plurality of sections constructed as substantially identical modules connected to conduct the exhaust horizontally in a path passing through all modules arranged in at least one of a series and a parallel arrangement.

17. A method for remediating outputs from a well producing a petroleous flow, the method comprising:
    selecting an energy source comprising a machine producing an exhaust comprising products of combustion, the energy source selected from an engine, a flare, and a heater consuming a first stream comprising at least a portion of the petroleous flow;
    receiving a second stream comprising exhaust from the energy source;
    influencing generation of the products of combustion by regulating dynamically a back pressure on the exhaust;
    scrubbing the second stream by spraying a liquid thereinto, the liquid comprising a third stream segregated from the petroleous flow, previously distinct from the first stream, and combining as part of the second stream during scrubbing;
    removing heat from the exhaust into the liquid to convert to steam at least a portion of the liquid;
    condensing substantially distilled water from the second stream by condensing water vapor therefrom;
    recovering into the liquid entering the scrubber heat extracted during the condensing; and
    discharging into a containment a residual comprising at least a portion of the liquid not evaporated during the scrubbing.

18. An apparatus for mutual remediation of materials from production of a petroleous flow, the apparatus comprising:
    an exhaust line receiving from an energy source an exhaust from combusting a fuel;
    a controller controlling back pressure on the exhaust dynamically and within a selected operating control parameter;
    a scrubber receiving the exhaust flow together with a spray of liquid comprising water from the petroleous flow;
    a first pressure controller increasing evaporation of the input liquid by reducing pressure in the scrubber;

a condenser receiving the exhaust from the scrubber, the condenser cooling the exhaust and condensing water vapor evaporated in the scrubber;

a second pressure controller increasing condensation of water vapor in the condenser by increasing pressure therein;

a drain discharging an output comprising at least a portion of the liquid and at least one of particulate solids and dissolved solids scrubbed from the exhaust; and a heat exchanger extracting from the output, and passing to the liquid, heat recovered from the exhaust into the output.

* * * * *